US012580808B2

(12) United States Patent
Heo et al.

(10) Patent No.: US 12,580,808 B2
(45) Date of Patent: Mar. 17, 2026

(54) PROCESSOR FOR PERFORMING, WHEN PROBLEM OCCURS, RECOVERY ROUTINE ON BASIS OF MONITORING OF NETWORK STATE AND THROUGHPUT, AND ELECTRONIC DEVICE INCLUDING SAME

(71) Applicant: Samsung Electronics Co., Ltd., Suwon-si (KR)

(72) Inventors: Joonyoung Heo, Suwon-si (KR); Gyujoon Park, Suwon-si (KR); Jongeon Park, Suwon-si (KR); Soukjin Bae, Suwon-si (KR); Chihun Ahn, Suwon-si (KR); Hyunjoon Cha, Suwon-si (KR); Minjung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 310 days.

(21) Appl. No.: 18/357,502

(22) Filed: Jul. 24, 2023

(65) Prior Publication Data

US 2023/0370327 A1    Nov. 16, 2023

Related U.S. Application Data

(63) Continuation of application No. PCT/KR2022/002566, filed on Feb. 22, 2022.

(30) Foreign Application Priority Data

Apr. 19, 2021    (KR) ........................ 10-2021-0050440

(51) Int. Cl.
| | |
|---|---|
| *H04L 41/0654* | (2022.01) |
| *H04L 41/0213* | (2022.01) |
| *H04L 41/0695* | (2022.01) |

(52) U.S. Cl.
CPC ...... *H04L 41/0654* (2013.01); *H04L 41/0213* (2013.01); *H04L 41/0695* (2013.01)

(58) Field of Classification Search
CPC ............. H04L 41/0654; H04L 41/0213; H04L 41/0695; H04L 69/18; H04L 41/0663; H04L 43/0817

See application file for complete search history.

(56) References Cited

U.S. PATENT DOCUMENTS

| | | | |
|---|---|---|---|
| 9,705,736 B2 | 7/2017 | Wang et al. | |
| 2008/0281963 A1* | 11/2008 | Fletcher ................. | H04L 43/12 709/224 |

(Continued)

FOREIGN PATENT DOCUMENTS

| | | |
|---|---|---|
| KR | 20050034478 A | 4/2005 |
| KR | 100544900 B1 | 1/2006 |

(Continued)

OTHER PUBLICATIONS

International Search Report for PCT/KR2022/002566 mailed May 30, 2022, 3 pages.

(Continued)

*Primary Examiner* — Cheikh T Ndiaye
(74) *Attorney, Agent, or Firm* — NIXON & VANDERHYE P.C.

(57) ABSTRACT

An electronic device may include a communication module for exchanging data with an external device, and at least one processor for controlling the electronic device, wherein the processor may: receive first information regarding the state of a network interface controller (NIC) driver for the communication module; receive, as second information, at least a part of simple network management protocol (SNMP) information regarding a network stack; receive third information regarding the state of sockets; determine a target problem state of the electronic device on the basis of the first information, the second information, and the third information; and perform a preconfigured target recovery operation corresponding to the determined target problem state.

17 Claims, 7 Drawing Sheets

(56)                    References Cited

U.S. PATENT DOCUMENTS

| | | | |
|---|---|---|---|
| 2010/0064177 A1* | 3/2010 | Li | ........................ G06F 11/1443 |
| | | | 714/38.14 |
| 2012/0269089 A1 | 10/2012 | Morrill | |
| 2015/0263886 A1 | 9/2015 | Wang et al. | |
| 2021/0099936 A1* | 4/2021 | Gupta | ................... H04W 80/06 |

FOREIGN PATENT DOCUMENTS

| | | | |
|---|---|---|---|
| KR | 20080109662 | A | 12/2008 |
| KR | 20090112733 | A | 10/2009 |
| KR | 20130036510 | A | 4/2013 |
| KR | 20140091019 | A | 7/2014 |
| KR | 20140116466 | A | 10/2014 |
| KR | 20160027983 | A | 3/2016 |
| KR | 101623197 | B1 | 5/2016 |
| KR | 101740871 | B1 | 5/2017 |
| KR | 101850549 | B1 | 4/2018 |
| KR | 10-2019-0089697 | A | 7/2019 |

OTHER PUBLICATIONS

Written Opinion of the ISA for PCT/KR2022/002566 mailed May 30, 2022, 4 pages.
Extended European Search Report dated May 13, 2024 for EP Application No. 22791863.8.
Korean 1$^{st}$ Office Action issued on Sep. 15, 2025, for the corresponding Korean Patent Application No. 10-2021-0050440 and English translation, 10 pp.

* cited by examiner

From operations 410, 420, 430

To operation 450

1

PROCESSOR FOR PERFORMING, WHEN PROBLEM OCCURS, RECOVERY ROUTINE ON BASIS OF MONITORING OF NETWORK STATE AND THROUGHPUT, AND ELECTRONIC DEVICE INCLUDING SAME

CROSS-REFERENCE TO RELATED APPLICATIONS

This application is a continuation application of International Application No. PCT/KR2022/002566 designating the United States, filed on Feb. 22, 2022, in the Korean Intellectual Property Receiving Office and claiming priority to Korean Patent Application No. 10-2021-0050440, filed on Apr. 19, 2021, in the Korean Intellectual Property Office, the disclosures of which are incorporated by reference herein in their entireties.

BACKGROUND

Technical Field

Various example embodiments relate to an electronic device for recovering a network data throughput of the electronic device.

Description of Related Art

In a process of using a wireless communication terminal, problems related to processing network data frequently occur, and representative examples thereof may include packet loss and performance degradation of downlink/uplink data throughput. In addition, the fifth generation (5G) communication technology may theoretically support a data transmission speed of up to 20 gigabits per second (Gbps), and this transmission speed may be sufficiently high such that a processor of a wireless communication terminal may not guarantee the completion of data processing even though it exerts its maximum performance. A process of processing network data may include a processing step in a network interface controller (NIC) driver, a processing step in a network stack of a kernel, and a processing step in a user space.

SUMMARY

An example embodiment may provide an electronic device for recovering a network data throughput of the electronic device.

However, technical aspects are not limited to the foregoing aspect, and other technical aspects may be present.

According to various example embodiments, there is provided an electronic device which may include: a communication module (comprising communication circuitry) configured to exchange data with an external device; and at least one processor configured to control the electronic device. The processor may be configured to: receive first information regarding a state of a network interface controller (NIC) driver for the communication module; receive, as second information, at least a portion of simple network management protocol (SNMP) information regarding a network stack between the NIC driver and one or more sockets associated with one or more applications of the electronic device; receive third information regarding a state of the sockets; determine a target problem state of the electronic device based on the first information, the second information, and the third information; and perform a preset target recovery operation corresponding to the determined target problem state.

According to various example embodiments, there is provided a network data throughput recovery method performed by an electronic device, where the network data throughput recovery method may include: receiving first information regarding a state of a NIC driver for a communication module of the electronic device; receiving, as second information, at least a portion of SNMP information regarding a network stack between the NIC driver and one or more sockets associated with one or more applications of the electronic device; receiving third information regarding a state of the sockets; determining a target problem state of the electronic device based on the first information, the second information, and the third information; and performing a preset target recovery operation corresponding to the determined target problem state.

According to various example embodiments, an electronic device for recovering a network data throughput may be provided.

BRIEF DESCRIPTION OF DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, various example embodiments of the present disclosure will be described in detail with reference to the accompanying drawings. However, this is not intended to limit the present disclosure to specific example embodiments, and it is to be understood that various modifications, equivalents, and/or alternatives of the example embodiments of the present disclosure are included.

Figure 1:
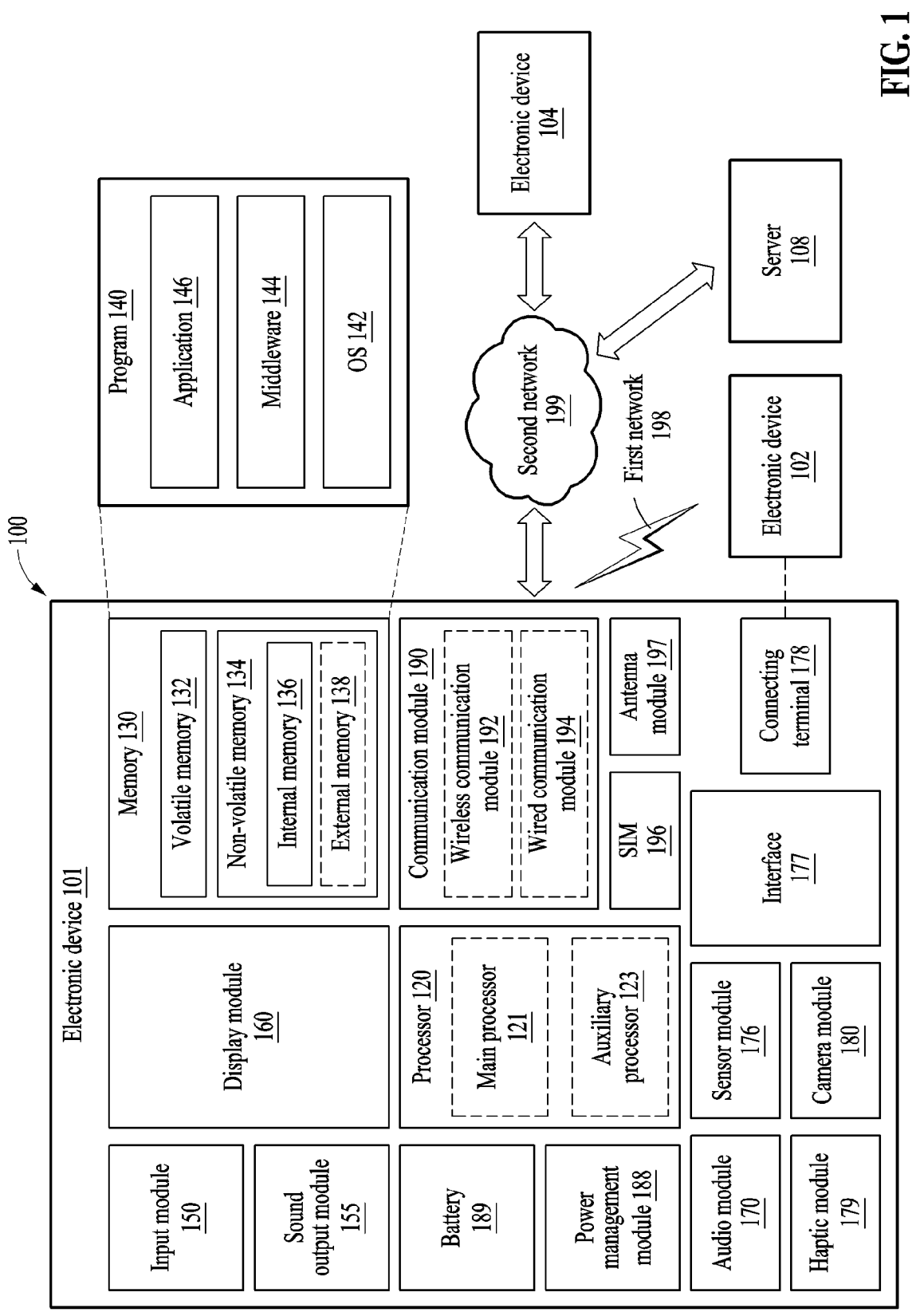
FIG. 1 is a block diagram illustrating an electronic device in a network environment according to various example embodiments.

FIG. 1 is a block diagram illustrating an electronic device in a network environment according to various example embodiments.

Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). The electronic device 101 may communicate with the electronic device 104 via the server 108. The electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected, directly or indirectly, to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. The processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121. Of course, each processor herein comprises processing circuitry.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). The auxiliary processor 123 (e.g., an ISP or a CP) may be implemented as a portion of another component (e.g., the camera module 180 or the communication module 190) that is functionally related to the auxiliary processor 123. The auxiliary processor 123 (e.g., an NPU) may include a hardware structure specifically for artificial intelligence (AI) model processing. An AI model may be generated by machine learning. The learning may be performed by, for example, the electronic device 101, in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. The receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control its corresponding one of the displays, the hologram device, and the projector. The display module 160 may include a touch sensor adapted to sense a touch, or a pressure sensor adapted to measure an intensity of a force of the touch.

The audio module 170 may convert sound into an electric signal or vice versa. The audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with an external electronic device (e.g., the electronic device 102) directly (e.g., by wire) or wirelessly. The interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). The connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. The haptic module 179 may include, for example, a motor, a piezoelectric element, or an electric stimulator.

The camera module 180 may capture a still image and moving images. The camera module 180 may include one or more lenses, image sensors, ISPs, and flashes.

The power management module 188 may manage power supplied to the electronic device 101. The power management module 188 may be implemented as, for example, at least a part of a power management integrated circuit (PMIC).

The battery 189 may supply power to at least one component of the electronic device 101. The battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., an LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4$^{th}$ generation (4G) network, and a next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., an mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 192 may support various requirements specified in the electronic device 101, an external electronic device (e.g., the electronic device 104), or a network system (e.g., the second network 199). The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form an mmWave antenna module. The mmWave antenna module may include a PCB, an RFIC on a first surface (e.g., a bottom surface) of the PCB or adjacent to the first surface of the PCB and capable of supporting a designated high-frequency band (e.g., a mmWave band), and a plurality of antennas (e.g., an antenna array) disposed on a second surface (e.g., a top or a side surface) of the PCB, or adjacent to the second surface of the PCB and capable of transmitting or receiving signals in the designated high-frequency band.

At least some of the above-described components may be coupled mutually and exchange signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device (e.g., the electronic device 104) via the server 108 coupled, directly or indirectly, with the second network 199. Each of the external electronic devices (e.g., the electronic device 102 or 104) may be a device of the same type as or a different type from the electronic device 101. All or some of operations to be executed by the electronic device 101 may be executed by one or more of the external electronic devices (e.g., the electronic devices 102 and 104 and the server 108). For example, if the electronic device 101 needs to perform a function or a service automatically, or in response to a request from a user or another device, the electronic device

101, instead of, or in addition to, executing the function or service, may request one or more external electronic devices to perform at least a part of the function or service. The one or more external electronic devices receiving the request may perform the at least part of the function or the service requested, or an additional function or an additional service related to the request and may transfer a result of the performance to the electronic device 101. The electronic device 101 may provide the result, with or without further processing of the result, as at least part of a response to the request. To that end, cloud computing, distributed computing, mobile edge computing (MEC), or client-server computing technology may be used, for example. The electronic device 101 may provide ultra-low latency services using, e.g., distributed computing or MEC. According to another embodiment, the external electronic device (e.g., the electronic device 104) may include an Internet-of-things (IoT) device. The server 108 may be an intelligent server using machine learning and/or a neural network. The external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

According to various example embodiments described herein, an electronic device may be a device of one of various types. The electronic device may include, as non-limiting examples, a portable communication device (e.g., a smartphone), a computing device, a portable multimedia device, a portable medical device, a camera, a wearable device, or a home appliance. However, the electronic device is not limited to the foregoing examples.

It is to be understood that various example embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B," "at least one of A and B," "at least one of A or B," "A, B, or C," "at least one of A, B, and C," and "at least one of A, B, or C," each of which may include any one of the items listed together in the corresponding one of the phrases, or all possible combinations thereof. Terms such as "1st" and "2nd" or "first" and "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., by wire), wirelessly, or via at least a third element(s).

As used in connection with certain embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in the form of an application-specific integrated circuit (ASIC). Thus, each "module" herein may comprise circuitry.

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method described herein may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2:
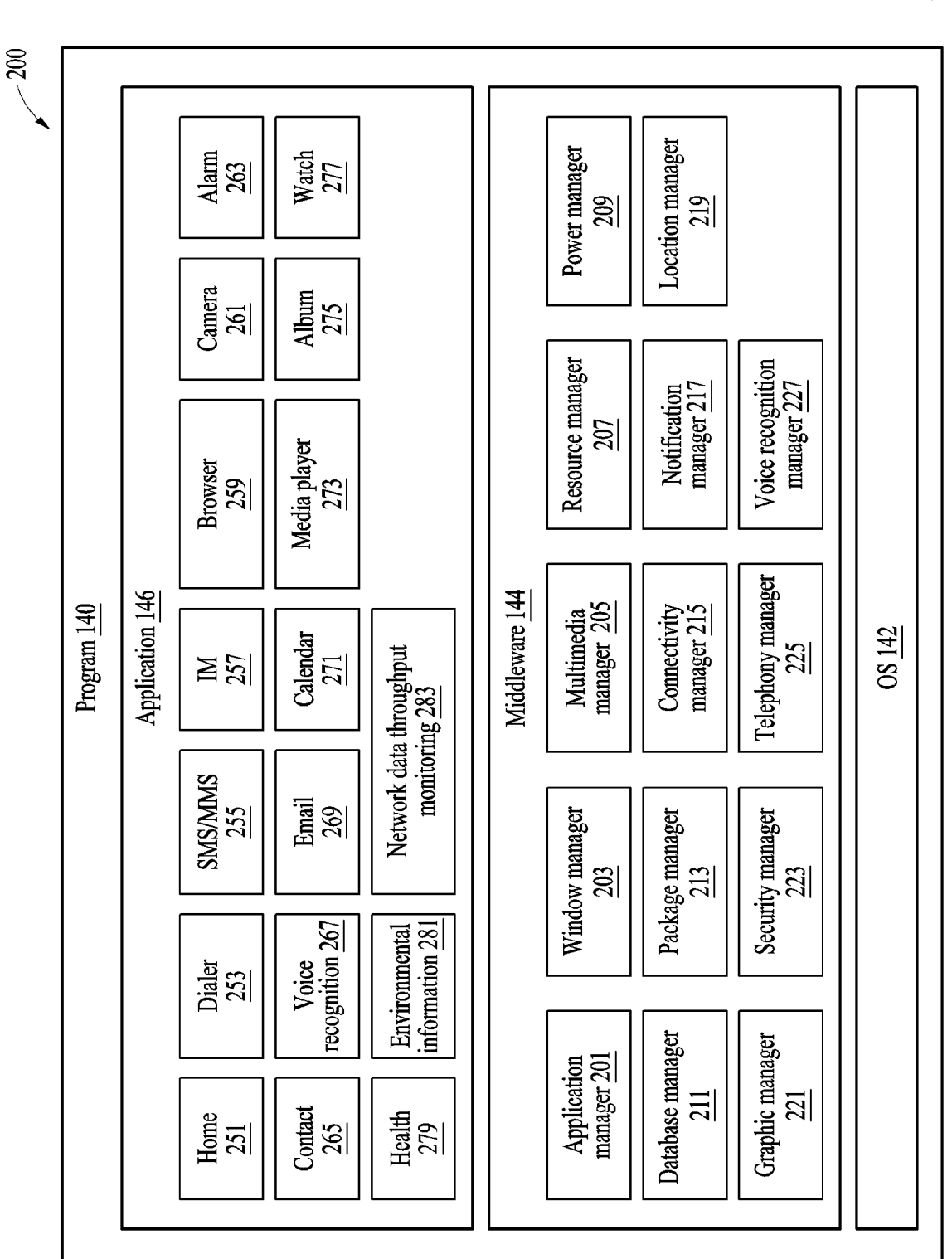
FIG. 2 is a block diagram illustrating a program according to various example embodiments.

FIG. 2 is a block diagram illustrating a program according to various example embodiments.

According to an example embodiment, the program 140 described above with reference to FIG. 1 may include an operating system (OS) 142 for controlling one or more resources of the electronic device 101, a middleware 144, or an application 146 executable in the OS 142. The OS 142 may include, for example, Android™, iOS™ Windows™, Symbian™, Tizen™, or Bada™. At least some of the program 140 may be pre-loaded in the electronic device 101 during the manufacture, or downloaded or updated from an external electronic device (e.g., the electronic device 102 or 104, or the server 108 of FIG. 1) when it is used by a user.

The OS 142 may control management (e.g., allocation or recovery) of one or more system resources (e.g., process, memory, or power supply) of the electronic device 101. The OS 142 may include, alternatively or additionally, one or more driver programs for driving or operating another hardware device of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that the application 146 uses functions or information provided by the one or more resources of the electronic device 101. The middleware 144 may include, for example, an application manager 201, a window manager 203, a multimedia manager 205, a resource manager 207, a power manager 209, a database (DB) manager 211, a package manager 213, a connectivity manager 215, a notification manager 217, a location manager 219, a graphics manager 221, a security manager 223, a telephony manager 225, or a voice recognition manager 227.

The application manager 201 may manage, for example, a life cycle of the application 146.

The window manager 203 may manage, for example, one or more graphical user interface (GUI) resources used for a screen.

The multimedia manager 205 may, for example, identify one or more formats required for playing media files, and encode or decode a media file among the media files using a codec corresponding to a selected format.

The resource manager 207 may manage, for example, a source code of the application 146 or a memory space of the memory 130.

The power manager 209 may manage, for example, capacity, temperature, or power of the battery 189, and determine or provide information necessary for operations of the electronic device 101 using corresponding information. According to an example embodiment, the power manager 209 may interwork with a basic input/output system (BIOS) (not shown) of the electronic device 101.

The DB manager 211 may generate, retrieve, or change a DB to be used by the application 147.

The package manager 213 may manage, for example, installation or update of an application distributed in the form of a package file.

The connectivity manager 215 may mange, for example, a wireless or direct connection between the electronic device 101 and an external electronic device.

The notification manager 217 may provide a function for notifying a user of an occurrence of a preset event (e.g., an incoming call, a message, or an alarm).

The location manager 219 may manage, for example, location information of the electronic device 101.

The graphics manager 221 may manage, for example, one or more graphical effects and related user interfaces (UIs) to be provided to a user.

The security manager 223 may provide, for example, system security or user authentication.

The telephony manager 225 may manage, for example, a voice call function or video call function provided by the electronic device 101.

The voice recognition manager 227 may transmit voice data (or audio data) of a user to the server 108 and receive, from the server 108, a command corresponding to a function to be performed in the electronic device 101 based on at least a portion of the audio data or text data converted based on at least a portion of the audio data.

According to an example embodiment, the middleware 144 may dynamically delete some of existing components or add new components. According to an example embodiment, at least a portion of the middleware 144 may be included as a part of the OS 142 or implemented as separate software different from the OS 142.

The application 146 may include, for example, home 251, dialer 253, short message service (SMS)/multimedia messaging service (MMS) 255, instant messaging (IM) 257, browser 259, camera 261, alarm 263, contacts 265, voice recognition 267, email 269, calendar 271, media player 273, album 275, watch 277, health 279 (e.g., measurement of bioinformation including, for example, an amount of physical exercise or blood sugar), environmental information 281 (e.g., measurement of atmospheric pressure, humidity, or temperature), or network data throughput monitoring 283 applications.

The network data throughput monitoring 283 may be an application that monitors in real time information associated with a network connection state and downlink/uplink data processing of the electronic device 101. The network data throughput monitoring 283 may adjust one or more parameters of the electronic device 101 to increase a network data throughput based on monitored information.

According to an example embodiment, the application 146 may further include an information exchange application (not shown) for supporting information exchange between the electronic device 101 and an external electronic device. The information exchange application may include, for example, a notification relay application set to transfer preset information (e.g., a call, a message, or an alarm) to an external electronic device, or a device management application set to manage an external electronic device. The notification relay application may transfer, to an external electronic device, notification information corresponding to a preset event (e.g., mail reception) occurring in another application (e.g., the email application 269) of the electronic device 101. Alternatively or additionally, the notification relay application may receive notification information from an external electronic device and provide the received notification information to a user of the electronic device 101.

The device management application may control a power supply (e.g., turning on/off) or functions (e.g., brightness, resolution, or focus) of an external electronic device communicating with the electronic device 101 or some components (e.g., a display module or a camera module) of the external electronic device. Alternatively or additionally, the device management application may support the installation, deletion, or updating of an application operating in an external electronic device.

Figure 3:
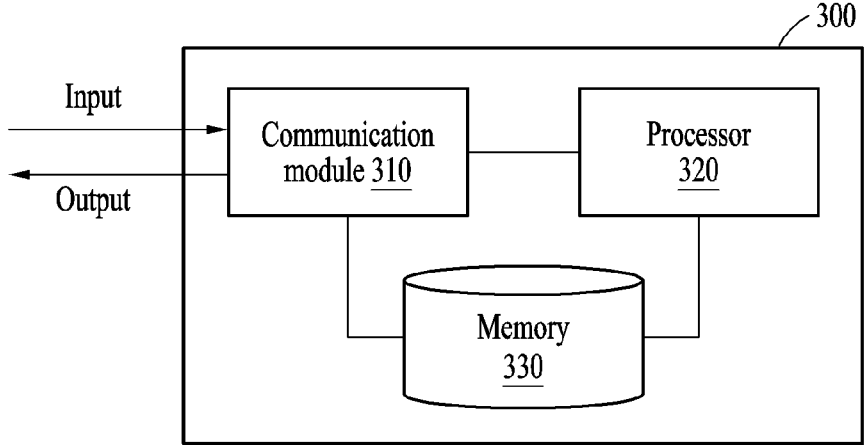
FIG. 3 is a block diagram illustrating an electronic device according to various example embodiments.

FIG. 3 is a block diagram illustrating an electronic device according to various example embodiments.

Referring to FIG. 3, an electronic device 300 (e.g., the electronic device 101 of FIG. 1) may include a communication module 310 (e.g., the communication module 190 of FIG. 1), a processor 320 (e.g., the processor 120 of FIG. 1), and a memory 330 (e.g., the memory 130 of FIG. 1). The communication module 310, the processor 320, and the memory 330 may be configured as a one-chip or based on different circuit elements.

According to an example embodiment, the communication module 310 may include a communication processor (CP). The communication module 310 may communicate with an external electronic device (e.g., the electronic device 104 of FIG. 1) via a first network (e.g., the first network 198 of FIG. 1) or a second network (e.g., the second network 199 of FIG. 1). For example, in a case in which the electronic device 300 and an external electronic device exchange data via a 5G network and next-generation communication technology, data received by the electronic device 300 from the external electronic device may be considered as downlink data, and data transmitted by the electronic device 300 to the external electronic device may be considered as uplink data. Hereinafter, the downlink data and the uplink data will be collectively referred to as network data.

A process of processing network data may include a processing step in a network interface controller (NIC) driver comprising driving circuitry, a processing step in a network stack of a kernel, and a processing step in a user space. Each of the processing steps may be considered as a layer. For example, the processing step in the NIC driver may be considered as a first layer, the processing step in the network stack may be considered as a second layer, and the processing step in the user space may be considered as a third layer. For example, the user space may include one or more sockets associated with one or more applications of the electronic device 300.

The NIC driver may convert a form of a packet of downlink data received from the communication module 310 into a form of data structure (e.g., socket buffer (SKB) form) of a kernel to be transmitted to the network stack, and convert the form of the data structure of the kernel received from the network stack into the form of a packet to be transmitted to the communication module 310.

The network stack may be present between the NIC driver and the user space and may process a protocol such as an internet protocol (IP), an internet control message protocol (ICMP), transmission control protocol (TCP), a user datagram protocol (UDP), and an internet control message protocol (ICMP). The network stack may generate simple network management protocol (SNMP) information including a reception error and a transmission error occurring for each protocol.

A socket in the user space may be a destination of communication between processes via a network. An application running on the electronic device 300 may generate a socket and exchange data with an external electronic device through the generated socket.

According to an example embodiment, the communication module 310 may transmit downlink data received from an external electronic device to the processor 320. The processor 320 may process the downlink data in sequential order of the NIC driver, the network stack, and the user space.

According to an example embodiment, the processor 320 may process uplink data generated through one or more applications in sequential order of the user space, the network stack, and the NIC driver, and may transmit the uplink data to an external electronic device through the communication module 310.

Since network data needs to be processed in a predetermined order of layers, if data processing is not completed in a previous layer, data processing may be delayed in a subsequent layer. That is, when a bottleneck in data processing occurs in a specific layer, a network data throughput of the electronic device 300 may be reduced.

According to an example embodiment, to maintain a data throughput at or above a certain level, monitoring whether a bottleneck in data processing occurs in layers may need to be performed. For example, the processor 320 may receive first information for a first layer, second information for a second layer, and third information for a third layer, and may thereby monitor whether there is a bottleneck in data processing. A method of receiving the first information, the second information, and the third information will be described in detail below with reference to FIGS. 4 to 6.

According to an example embodiment, the processor 320 may determine whether a bottleneck in data processing occurs in the layers based on the received first information, second information, and third information. For example, the first information may include information about a state of the NIC driver for the communication module 310. For example, the second information may include at least a part of SNMP information for the network stack. For example, the third information may include information about states of one or more sockets associated with one or more applications of the electronic device 300.

According to an example embodiment, the processor 320 may obtain one or more predetermined elements for determining a cause of the bottleneck from the first information, the second information, and the third information, and may then determine the cause of the bottleneck based thereon. A method of determining a problem state as a cause of a bottleneck will be described in detail below with reference to FIGS. 4 and 7.

According to an example embodiment, the processor 320 may perform a recovery operation corresponding to the determined problem state. For example, a specific recovery operation may be preset for a specific problem state. By performing the recovery operation, a network data throughput processed by the electronic device 300 may be recovered.

According to an example embodiment, the electronic device 300 may include a communication module 310 configured to exchange data with an external electronic device and at least one processor 320 configured to control the electronic device 300, and the processor 320 may receive first information about a state of the NIC driver for the communication module 310; receive, as second information, at least a part of SNMP information about the network stack between the NIC driver and one or more sockets associated with one or more applications of the electronic device 300; receive third information about a state of the sockets; determine a target problem state of the electronic device 300 based on the first information, the second information, and third information; and perform a preset target recovery operation corresponding to the determined target problem state.

According to an example embodiment, the electronic device 300 may be a mobile communication terminal.

Hereinafter, a method of recovering a network data throughput will be described in detail with reference to FIGS. 4 to 7.

Figure 4:
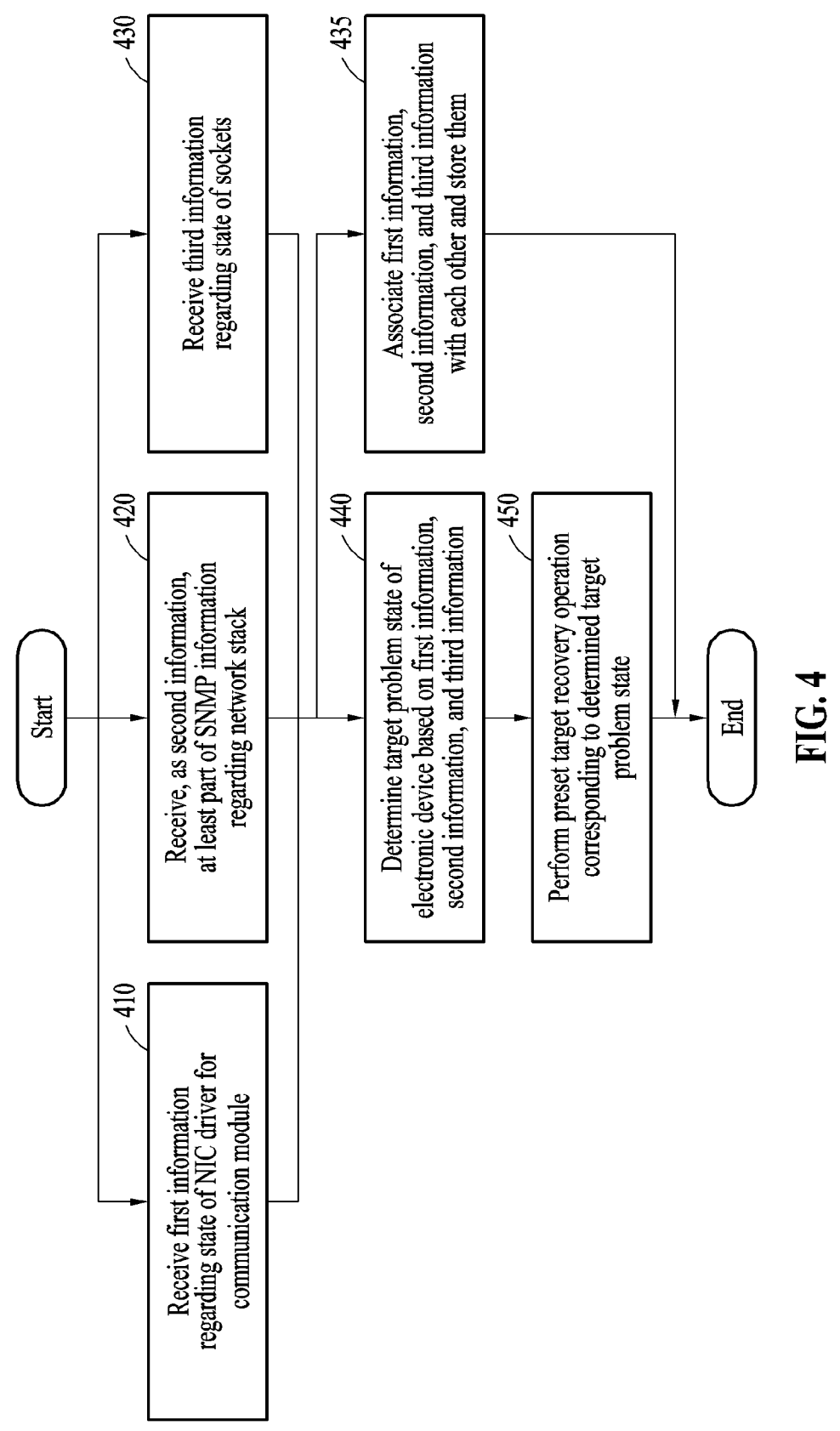
FIG. 4 is a flowchart illustrating a method of recovering a network data throughput of an electronic device according to various example embodiments.

FIG. 4 is a flowchart illustrating a method of recovering a network data throughput (or a network data throughput recovery method) of an electronic device according to various example embodiments.

Operations 410 to 460 may be performed by an electronic device (e.g., the electronic device 101 of FIG. 1 or the electronic device 300 of FIG. 3).

According to an example embodiment, operations 410 to 460 may be performed by a network data throughput monitoring application (e.g., the network data throughput monitoring 283 of FIG. 1). That is, a processor (e.g., the processor 120 of FIG. 1 or processor 320 of FIG. 3) of the electronic device may perform operations 410 to 460 by executing the network data throughput monitoring application.

In operation 410, the processor may receive first information about a state of a NIC driver for a communication module (e.g., the communication module 190 of FIG. 1 or the communication module 310 of FIG. 3).

According to an example embodiment, when an operating system (OS) of the electronic device is based on Linux, the processor may obtain the first information using a netlink message of Linux.

According to an example embodiment, the first information may include at least one of the number of successfully transmitted bytes, the number of successfully transmitted packets, the number of successfully received bytes, the number of successfully received packets, the number of transmitted error packets generated in the NIC driver, the number of received error packets generated in the NIC driver, the number of transmitted packets dropped in the NIC driver, or the number of received packets dropped in the NIC driver.

Operation 410 may be performed at an interval of a preset first period. For example, the preset period may be 1 second but is not limited thereto.

In operation 420, the processor may receive, as second information, at least a portion of SNMP information about a network stack between the NIC driver and one or more sockets associated with one or more applications of the electronic device. For example, the second information may include an error count of network data that has failed to be transmitted and received.

According to an example embodiment, when the OS of the electronic device is based on Linux, the processor may obtain the second information from an SNMP node of a proc file system.

According to an example embodiment, the second information to be received may be different according to a protocol of the network stack applied to network data. For example, the second information about IP may include IP Forwarding, IP InDiscards, IP InReceived, IP OutNoRoutes, IP InUnknownProtos, IP OutRequests, IP ReasmFailes, IP FragFails, IP InReceives, and IP InHdrErrors, but is not limited thereto. For example, the second information about TCP may include TCP Forwarding, TCP RetransSegs, TCP InSegs, TCP OutSegs, TCP OutRsts, TCP InCsumErrors, and TCP InErrs, but is not limited thereto. For example, the second information about UDP may include UDP InDatagrams, UDP OutDatagrams, UDP InErrors, UDP NoPorts, UDP Sndbuf, UDP RcvbufErrors, but is not limited thereto.

According to an example embodiment, when the error count of the second information increases, additional information about data (e.g., a packet) generating a corresponding error may be received along with the second information. The additional information may include a plain text file or a packet capture (pcap) file.

Operation 420 may be performed at an interval of a preset second period. For example, the preset period may be 1 second but is not limited thereto.

In operation 430, the processor may receive third information about one or more sockets. The sockets may be sockets performing data exchange with an external electronic device.

According to an example embodiment, the processor may obtain the third information about the sockets using a diagnostic socket. A method in which the processor receives the third information about the sockets using the diagnostic socket will be described in detail below with reference to FIG. 6.

According to an example embodiment, the third information may include a destination IP of a session, a source (or departure) IP of the session, a port, a TCP state, a process ID using a socket, the number of write queues, and the number of read queues, but it not limited thereto.

Operation 430 may be performed at an interval of a preset third period. For example, the preset period may be 1 second but is not limited thereto.

According to an example embodiment, operations 410 to 430 may be performed independently and in parallel. For example, operations 410 to 430 may be temporally synchronized and performed repeatedly.

As operations 410 to 430 are temporally synchronized and performed accordingly, the received first, second, and third information may represent a current situation of the electronic device at a specific point in time. For example, when a current network data throughput is less than a preset size, a cause of a decrease in the data throughput may be identified in real time based on the synchronized first, second, and third information.

In operation 435, the processor may store the first information, the second information, and the third information so as to be associated with each other. For example, the first information, the second information, and the third information received at the same point in time may be associated. The associated first, second, and third information may be stored in the form of a log.

According to an example embodiment, the additional information received together with the second information may be stored in association with the first information, the second information, and the third information. The additional information may be used to further analyze a problem state in detail.

In operation 440, the processor may determine a target problem of the electronic device based on the first information, the second information, and the third information.

According to an example embodiment, the processor may determine the target problem of the electronic device each time the first information, the second information, and the third information are received. For example, when data processing is smoothly performed, it may be determined that there is no problem. For example, when data processing is not smoothly performed, one or more problems may be determined simultaneously.

According to an example embodiment, the processor may determine whether a current data throughput is less than or equal to a preset threshold, and when the current data throughput is less than or equal to the threshold, the processor may determine the target problem of the electronic device based on most recently received first information, second information, and third information.

For example, a target problem state may be that there is a socket in an invalid state.

For example, the target problem state may be that there is a target socket that is not discarded (or disconnected) even though a NIC state is changed.

For example, the target problem state may be that unprocessed data is abnormally accumulated in a read queue of a socket.

For example, the target problem state may be about a state of a buffer of a socket. For example, when the protocol is UDP, the target problem state may be that an overflow occurs in a receiving buffer of a socket. For example, when the protocol is TCP, the target problem state may be that the size of the receiving buffer of the socket is small.

For example, the target problem state may be that downlink data is being dropped from the NIC driver.

The target problem state is not limited to the foregoing examples but may be preset such that various situations are determined as problem states based on the first information, the second information, and the third information.

A method of determining a target problem of the electronic device will be determined in detail below with reference to FIG. 7.

In operation 450, the processor may perform a preset target recovery operation corresponding to the determined target problem state.

For example, when the target problem state is that there is a socket in an invalid state, the target recovery operation may be performed by discarding the socket in the invalid state.

For example, when the target problem state is that there is a target socket that is not discarded despite a change in the NIC state, the target recovery operation may be performed by discarding the socket that is not discarded.

For example, when the target problem state is that unprocessed data is abnormally accumulated in a read queue of a socket, the target recovery operation may be performed by changing a scheduling method of applications. For example, when the OS of the electronic device is based on Linux, the processor may increase a processing priority of an application of a target socket by changing a nice value or ioprio of Linux.

For example, when the target problem state is about a state of a buffer of a socket, the target recovery operation may be performed by increasing the size of a receiving buffer of the socket.

For example, when the target problem state is that downlink data is being dropped in the NIC driver, the target recovery operation may be performed by increasing the size of a queue of the NIC driver.

The recovery operation is not limited to the foregoing examples, and various recovery operations may be preset to solve various problem states. For example, the processor may perform the target recovery operation by adjusting one or more parameters of the NIC driver, the network stack, and the sockets.

According to an example embodiment, various problem states and various recovery operations may be prestored in the form of a lookup table.

According to an example embodiment, a plurality of problem states may be simultaneously determined at a specific point in time. When the plurality of problem states is simultaneously determined, a processing priority among the plurality of problem states may be determined according to a type of data to be processed. For example, in the case of downlink data, a problem state of the NIC driver may be determined as a first priority, a problem state of the network stack as a second priority, and a problem state of the sockets as a third priority. For example, in the case of uplink data, the problem state of the sockets may be determined as the first priority, the problem state of the network stack as the second priority, and the problem state of the NIC driver as the third priority. In addition, recovery operations corresponding to the problem states may also be sequentially performed according to the priority of the problem states.

According to an example embodiment, the network data throughput recovery method may include operation 410 of receiving first information about a state of the NIC driver for the communication module 310 of the electronic device 300;

operation 420 of receiving, as second information, at least a portion of SNMP information about the network stack between the NIC driver and one or more sockets associated with one or more applications of the electronic device 300; operation 430 of receiving third information about a state of the sockets; operation 440 of determining a target problem state of the electronic device 300 based on the first information, the second information, and the third information; and operation 450 of performing a preset target recovery operation corresponding to the determined target problem state.

According to an example embodiment, the network data throughput recovery method may further include operation 435 of storing the first information, the second information, and the third information in association with each other.

According to an example embodiment, when the target problem state is the presence of a target socket in an invalid state, the target recovery operation corresponding to the target problem state may be an operation of discarding the target socket.

According to an example embodiment, when the target problem state is the presence of a target socket that is not discarded despite a change in a NIC state, the target recovery operation corresponding to the target problem state may be an operation of discarding the target socket.

According to an example embodiment, the processor 320 may perform the target recovery operation by adjusting one or more parameters of the NIC driver, the network stack, and the sockets.

Figure 5:
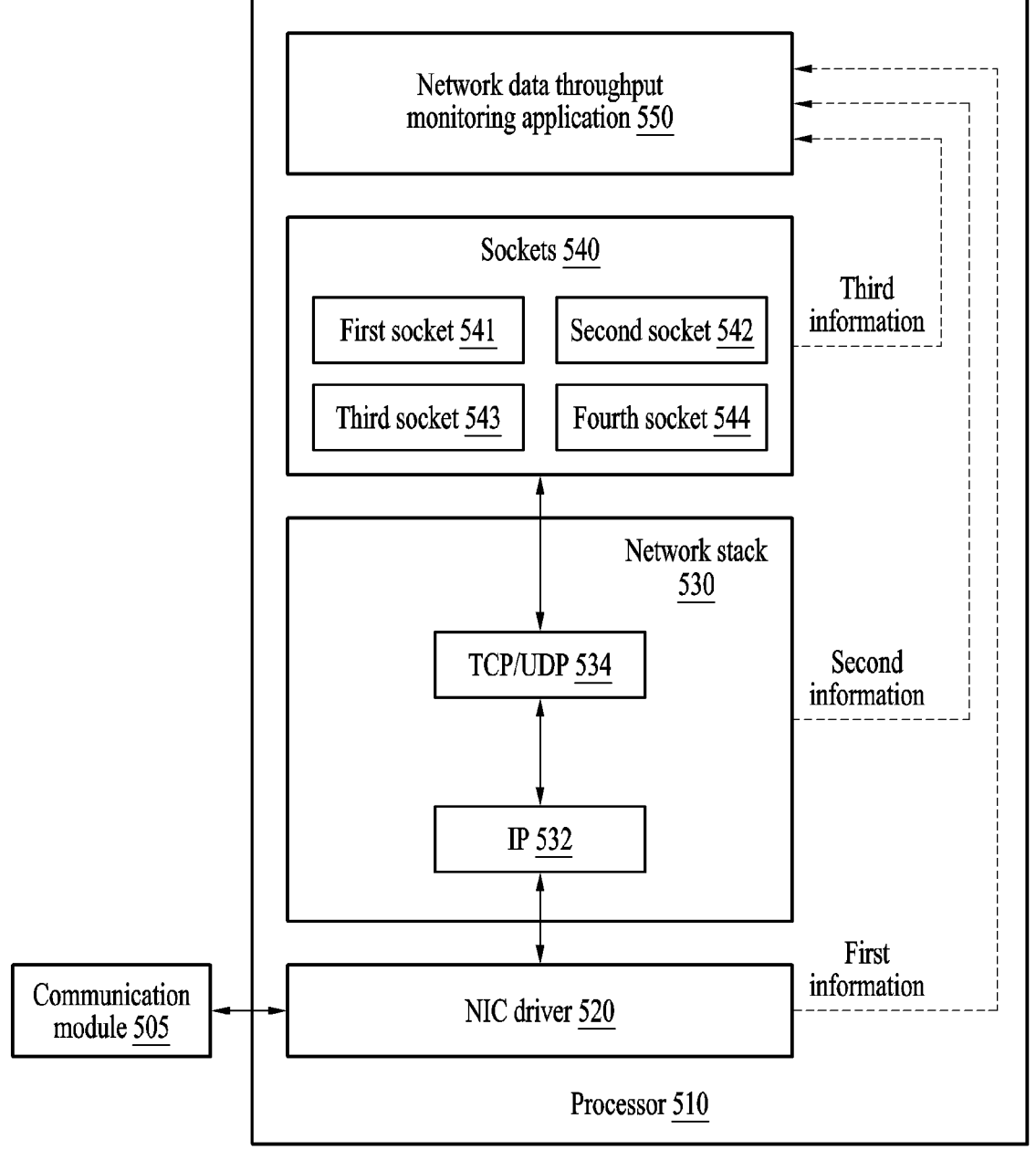
FIG. 5 is a diagram illustrating a configuration of layers processing network data according to various example embodiments.

FIG. 5 is a diagram illustrating a configuration of layers processing network data according to various example embodiments.

A processor 510 (e.g., the processor 120 of FIG. 1 or the processor 320 of FIG. 3) communicating with an external electronic device (e.g., the electronic device 104 of FIG. 1) via a communication module 505 (e.g., the communication module 190 of FIG. 1 or the communication module 310 of FIG. 3) may configure a first layer for a NIC driver 520, a second layer for a network stack 530, and a third layer for sockets 540.

According to an example embodiment, the processor 510 may be an application processor (AP). For example, the AP may be implemented as a system on chip (SoC) but is not limited thereto.

According to an example embodiment, the NIC driver 520, the network stack 530, and the sockets 540 may each be implemented based on a software module included in a program (e.g., the program 140 of FIG. 1). For example, the processor 510 may execute a software module of a program stored in a memory (e.g., the memory 130 of FIG. 1) to implement each of the NIC driver 520, the network stack 530, and the sockets 540.

According to an example embodiment, the processor 510 may monitor the first layer, the second layer, and the third layer by executing a network data throughput monitoring application 550. The application 550 may receive first information about the NIC driver 520 for monitoring the first layer, receive at least a portion of SNMP information as second information for monitoring the second layer, and receive third information about the sockets 540 for monitoring the third layer. For example, the application 550 may include a plurality of layer managers for managing the respective layers and a main manager integrating the plurality of layer managers. Each layer manager may receive information of a corresponding layer and transmit the received information to the main manager. The main manager may determine a problem state based on the received information, and inform the corresponding layer manager of the determined problem state and a recovery operation corresponding thereto. The layer manager informed of the problem state may perform the recovery operation corresponding to the problem state.

According to an example embodiment, the network stack 530 may process a plurality of protocols. For example, the network stack 530 may include sublayers for processing IP 532 and TCP/UDP 534.

According to an example embodiment, the sockets 540 may include one or more sockets 541, 542, 543, and 544. Each socket may be used for a specific application. For example, at least one of the sockets 540, for example, the fourth socket 544, may be a socket used for the application 550.

Figure 6:
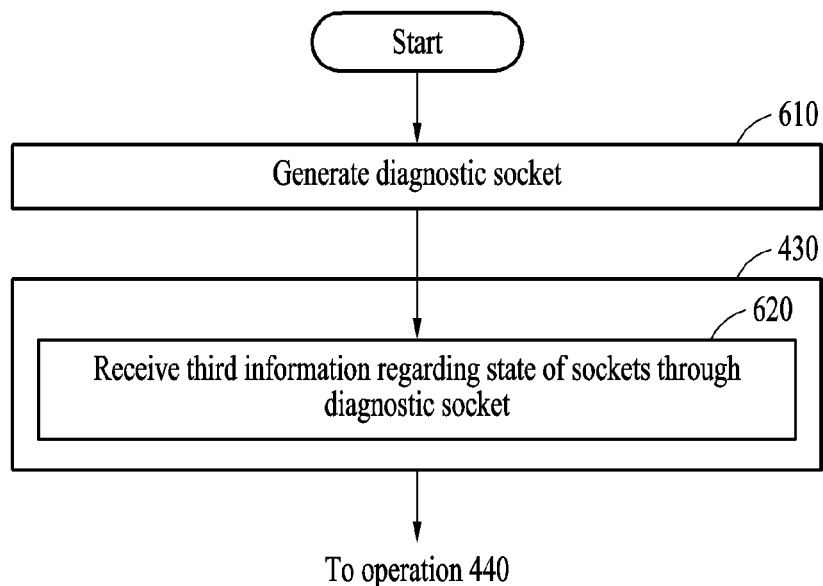
FIG. 6 is a flowchart illustrating a method of receiving third information regarding a state of sockets through a diagnostic socket according to various example embodiments.

FIG. 6 is a flowchart illustrating a method of receiving third information regarding a state of sockets through a diagnostic socket according to various example embodiments.

According to an example embodiment, operation 610 to be described hereinafter may be performed before operation 430 described above with reference to FIG. 4 is performed.

In operation 610, a processor (e.g., the processor 120 of FIG. 1 or the processor 320 of FIG. 3) of an electronic device (e.g., the electronic device 101 of FIG. 1 or the electronic device 300 of FIG. 3) may generate a diagnostic socket (e.g., the fourth socket of FIG. 5). For example, when operations 410 to 460 are performed by a network data throughput monitoring application (e.g., the network data throughput monitoring 283 of FIG. 1), a diagnostic socket for the network data throughput monitoring application may be According to an example embodiment, operation 440 described above with reference to FIG. 4 may include following operations 710 and 720. Operations 710 and 720 may be performed by a processor (e.g., the processor 120 of FIG. 1 or the processor 320 of FIG. 3) of an electronic device (e.g., the electronic device 101 of FIG. 1 or the electronic device 300 of FIG. 3).

In operation 710, the processor may obtain one or more predetermined elements by parsing first information, second information, and third information. For example, an element may be specific detailed information included in each information.

In operation 720, the processor may determine a target problem state from among preset problem states based on the one or more elements. For example, a first problem state associated with a first element may be determined by comparing the first element to a first condition preset for the first element. For example, a second problem state associated with a combination of two or more elements may be determined by comparing the combination of two or more elements to a second condition preset for the combination. Determining a problem state by combining elements of information obtained from different layers may be more accurate in diagnosing the problem state than determining the problem state using only an element of information obtained from a specific one layer.

For example, problem states may be described with reference to Table 1 below. In Table 1, the left side of the condition item represents an element or a combination of elements, and the right side of the condition item represents a preset condition.

TABLE 1

| Conditions | Problem states |
| --- | --- |
| socket.tcp__state == (LACT__ACK\|TIME__WAIT) && socket.lasting__time > MAX__TIMEOUT | Presence of a socket in an invalid state |
| net__dev.state == UNREGISTER__FINAL && (net__dev.n__sockets > 0) | Presence of a socket that is not discarded |
| socket.rq > 0 && socket.rq__nonzero__state > MAX__RQ__TIME | Abnormal accumulation of unprocessed data in a read queue of a socket |
| socket.proto == UDP && netstack.snmp.rcvbuferror > 0 | Occurrence of an overflow in a receiving buffer of a socket |
| socket.proto == TCP && netstack.rmen__max − socket.socket.rq < WINDOW__THRESHOLD | Small size of a receiving buffer of a socket |
| net__dev.rx__drops > 0 | Downlink data dropped in a NIC driver | generated. For example, operation 610 may be performed along with an initialization operation of the network data throughput monitoring application.

According to an example embodiment, operation 430 may include following operation 620.

In operation 620, the processor may receive third information about a state of sockets (e.g., the first socket 541, the second socket 542, and the third socket 543 of FIG. 5) via the diagnostic socket (e.g., the fourth socket 544 of FIG. 5).

According to an example embodiment, operation 430 of receiving the third information about the state of sockets may include operation 620 of receiving the third information about the state of sockets via the diagnostic socket generated in advance.

Figure 7:
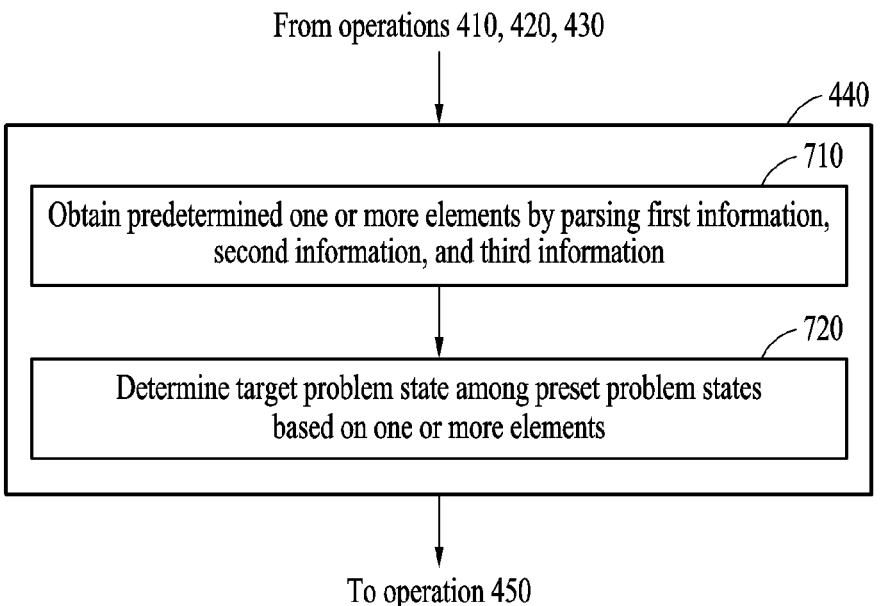
FIG. 7 is a flowchart illustrating a method of determining a target problem state based on first information, second information, and third information according to various example embodiments.

FIG. 7 is a flowchart illustrating a method of determining a target problem state based on first information, second information, and third information according to various example embodiments.

In Table 1, "net_dev" indicates an element obtained from the first information of the first layer, "netstack" indicates an element obtained from the second information of the second layer, and "socket" indicates an element obtained from the third information of the third layer.

According to an example embodiment, operation 440 of determining a target problem state of the electronic device may include operation 710 of obtaining one or more predetermined elements by parsing the first information, the second information, and the third information, and operation 720 of determining the target problem state from among preset problem states based on the one or more elements. "Based on" as used herein covers based at least on.

After operation 720 is performed, operation 450 described above with reference to FIG. 5 may be performed.

In operation 450, the processor may perform a preset target recovery operation corresponding to the determined target problem state.

For example, recovery operations described in Table 2 corresponding to Table 1 may be performed.

TABLE 2

| Problem states | Recovery operations |
|---|---|
| Presence of a socket in an invalid state | Discard the socket in the invalid state (first recovery operation)<br>socket –> sk_prot –> disconnect( ) |
| Presence of a socket that is not discarded | Discard the socket that is not discarded (second recovery operation)<br>socket –> sk_prot –> disconnect( ) |
| Abnormal accumulation of unprocessed data in a read queue of a socket | Change a scheduling method of applications (third recovery operation)<br>ioprio_set(pid, new_priority)<br>setpriority(pid, new_priority) |
| Occurrence of an overflow in a receiving buffer of a socket | Increase the size of the receiving buffer of the socket (fourth recovery operation)<br>netstack.rmen_max += INC_RMEN |
| Small size of a receiving buffer of a socket | Increase the size of the receiving buffer of the socket (fifth recovery operation)<br>netstack.rmen_max += INC_RMEN |
| Downlink data dropped in a NIC driver | Increase the size of a queue of the NIC driver (sixth recovery operation)<br>net_dev.netdev_max_backlog += INC_BACKLOG |

In Table 2 above, the first recovery operation may be an operation of periodically arranging sockets in the invalid state. Using, a LAST_ACK or TIME_WAIT state, a socket that has not been discarded for a certain period of time even though an application does not use the socket may be classified as a socket in an abnormal state. By a session for the socket in the abnormal state, a read buffer or write buffer of the socket may be allocated, and accordingly finite resources such as a port number or an Mode number may be consumed. To prevent or reduce such resource consumption, the socket in the abnormal state may be discarded.

In Table 2, the second recovery operation may be an operation of periodically organizing sockets that are not discarded. When a state of the NIC driver changes to a down or unregister state, sockets having a previous IP may need to be discarded. Sockets that are not discarded even though the state of the NIC driver is changed to the down or unregister state may be discarded through the recovery operation.

In Table 2, the third recovery operation may be an operation of changing a scheduling method of applications. That a read queue of a socket is not emptied may be an application problem or a problem that data processing does not operate smoothly due to limited resources of the electronic device. For example, a processing scheduling method of the applications may be changed to improve data throughput. For example, in a case of an FTP protocol, an access priority of a file system may affect the data throughput and thus, when an input/output is insufficient compared to the data throughput, a read queue of a socket may be emptied fast by adjusting ioprio.

In Table 2, the fourth recovery operation may be an operation of increasing the size of a receiving buffer of a socket. In a case of an overflow occurring in a receiving buffer of a socket for UDP, a problem may be solved by increasing the size of the receiving buffer of the socket. When the overflow continues to occur in the receiving buffer even after increasing the size of the receiving buffer of the socket, insufficient processing performance of the processor may be a cause of the problem, and thus the problem may be solved by adjusting parameters for the processing performance of the processor.

In Table 2, the fifth recovery operation may be an operation of increasing the size of a receiving buffer of a socket.

Since the size of a receiving buffer of a socket for TCP may determine a TCP window size, increasing the size of the receiving buffer of the socket may increase the TCP window size when a read queue of the socket is not emptied.

In Table 2, the sixth recovery operation may be an operation of increasing the size of a queue of the NIC driver. For example, in a state where downlink data is being dropped in the NIC driver, the size of a backlog queue of the NIC driver may be increased.

According to an example embodiment, when the same problem state occurs even after the preset first target recovery operation is performed, the processor may additionally perform the second target recovery operation associated with the first target recovery operation. For example, when there is a problem that downlink data is dropped in the NIC driver, the processor may primarily increase the size of the backlog queue of the NIC driver. However, even when the same problem state continues despite the increase in the size of the queue of the NIC driver, the processor may secondarily increase the size of a receiving buffer of the network stack, which is an upper layer of a layer of the NIC driver, or improve the processing performance of the processor.

According to an example embodiment, the second target recovery operation associated with the first target recovery operation may vary according to a type of network data (e.g., downlink data or uplink data).

The example embodiments described herein may be implemented using a hardware component, a software component, and/or a combination thereof. A processing device may be implemented using one or more general-purpose or special-purpose computers, such as, for example, a processor, a controller, and an arithmetic logic unit (ALU), a DSP, a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is singular; however, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or one or more combinations thereof, to independently or collectively instruct or configure the processing device to operate as desired. The software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the example embodiments have been described with reference to the limited drawings, a person skilled in the art may apply various technical modifications and variations based thereon. For example, suitable results may be achieved if the described techniques are performed in a different order, and/or if components in a described system, architecture, device, or circuit are combined in a different manner, and/or replaced or supplemented by other components or their equivalents. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

Therefore, other implementations, other examples, and equivalents to the claims are also within the scope of the following claims.

The invention claimed is:

1. An electronic device, comprising:
a communication module, comprising communication circuitry, configured to exchange data with an external device; and
at least one processor, comprising processor circuitry, configured to control the electronic device,
wherein, as a network data throughput monitoring application executes, the at least one processor is configured, individually and/or collectively, to:
receive first information regarding a state of a network interface controller (NIC) driver for the communication module, wherein the first information comprises at least one of a number of successfully transmitted bytes or packets, a number of successfully received bytes or packets, a number of transmitted or received error packets generated in the NIC driver, a number of transmitted or received packets dropped in the NIC driver;
receive, as second information, at least a portion of simple network management protocol (SNMP) information regarding a network stack between the NIC driver and one or more sockets associated with one or more applications of the electronic device, wherein the second information comprises an error count of network data that has failed to be transmitted and received;
generate a diagnostic socket for the network data throughput monitoring application:
receive third information regarding a state of the one or more sockets via the diagnostic socket:
determine a target problem state of the electronic device based on the first information, the second information, and the third information; and
perform a preset target recovery operation based on the determined target problem state.

2. The electronic device of claim 1, wherein the second information is different according to a protocol of the network stack.

3. The electronic device of claim 1, wherein the third information comprises at least one of:
an identifier (ID) of a process using a socket, a number of write queues, and/or a number of read queues.

4. The electronic device of claim 1, wherein the at least one processor is configured, individually and/or collectively, so that the first information, the second information, and the third information are to be received at an interval of a preset period.

5. The electronic device of claim 4, wherein the at least one processor is configured, individually and/or collectively, to:
store the first information, the second information, and the third information in association with each other.

6. The electronic device of claim 1, wherein the at least one processor is configured individually and/or collectively, to:
obtain one or more predetermined elements by parsing the first information, the second information, and the third information; and
determine the target problem state from among preset problem states based on the one or more elements.

7. The electronic device of claim 1, wherein the at least one processor is configured, individually and/or collectively, so that, when the target problem state is the presence of a target socket in an invalid state, the target recovery operation corresponding to the target problem state is an operation of discarding the target socket.

8. The electronic device of claim 1, wherein the at least one processor is configured, individually and/or collectively, so that, when the target problem state is the presence of a target socket that is not discarded despite a change in a NIC state, the target recovery operation corresponding to the target problem state is an operation of discarding the target socket.

9. The electronic device of claim 1, wherein the at least one processor is configured, individually and/or collectively, to:

perform the target recovery operation by adjusting one or more parameters for the NIC driver, the network stack, and the sockets.

10. The electronic device of claim 1, wherein the electronic device is a mobile communication terminal.

11. A network data throughput recovery method performed by executing a network data throughput monitoring application by an electronic device, the method comprising:

receiving first information regarding a state of a network interface controller (NIC) driver for the electronic device, wherein the first information comprises at least one of a number of successfully transmitted bytes or packets, a number of successfully received bytes or packets, a number of transmitted or received error packets generated in the NIC driver, a number of transmitted or received packets dropped in the NIC driver;

receiving, as second information, at least a portion of simple network management protocol (SNMP) information regarding a network stack between the NIC driver and one or more sockets associated with one or more applications of the electronic device, wherein the second information comprises an error count of network data that has failed to be transmitted and received;

generating a diagnostic socket for the network data throughput monitoring application:

receiving third information regarding a state of the one or more sockets via the diagnostic socket;

determining a target problem state of the electronic device based on the first information, the second information, and the third information; and performing a preset target recovery operation based on the determined target problem state.

12. The network data throughput recovery method of claim 11, further comprising:

storing the first information, the second information, and the third information in association with each other.

13. The network data throughput recovery method of claim 11, wherein the determining the target problem state of the electronic device comprises:

obtaining one or more predetermined elements by parsing the first information, the second information, and the third information; and determining the target problem state from among preset problem states based on the one or more elements.

14. The network data throughput recovery method of claim 11, wherein when the target problem state is the presence of a target socket in an invalid state, the target recovery operation corresponding to the target problem state is an operation of discarding the target socket.

15. The network data throughput recovery method of claim 11, wherein when the target problem state is the presence of a target socket that is not discarded despite a change in a NIC state, the target recovery operation corresponding to the target problem state is an operation of discarding the target socket.

16. The network data throughput recovery method of claim 11, wherein the performing the preset target recovery operation comprises:

performing the target recovery operation by adjusting one or more parameters of the NIC driver, the network stack, and the sockets.

17. A non-transitory computer-readable storage medium storing instructions that, when executed by at least one processor, comprising processor circuitry, cause the at least one processor, individually and/or collectively, to perform the network data throughput recovery method of claim 11.

* * * * *